(12) United States Patent
Madduri et al.

(10) Patent No.: US 8,725,839 B2
(45) Date of Patent: May 13, 2014

(54) IMPOSING PRE-INSTALLATION PREREQUISITE CHECKS ON THE INSTALL USER TO ENSURE A HIGHER RATE OF INSTALLATION SUCCESS

(75) Inventors: Hari H. Madduri, Austin, TX (US); Siu Hei Ng, Toronto (CA); Teodor Laurentiu Tecsa, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 996 days.

(21) Appl. No.: 12/644,278

(22) Filed: Dec. 22, 2009

(65) Prior Publication Data

US 2011/0154317 A1    Jun. 23, 2011

(51) Int. Cl.
*G06F 15/16* (2006.01)
*G06F 9/445* (2006.01)

(52) U.S. Cl.
USPC .......................................... 709/219; 717/174

(58) Field of Classification Search
None
See application file for complete search history.

(56) References Cited

U.S. PATENT DOCUMENTS

| | | | |
|---|---|---|---|
| 6,718,549 B1 | 4/2004 | Narin et al. | |
| 7,000,230 B1 | 2/2006 | Murray et al. | |
| 7,155,713 B1 | 12/2006 | Burkhardt et al. | |
| 7,530,065 B1 | 5/2009 | Ciudad et al. | |
| 2004/0236843 A1* | 11/2004 | Wing et al. | 709/219 |
| 2006/0224544 A1 | 10/2006 | Keith, Jr. | |
| 2008/0109783 A1* | 5/2008 | Govindarajan et al. | 717/100 |

OTHER PUBLICATIONS

Pascoe et al.; "On the Use of Mobile Tools in Everyday Life"; ACM Digital Library; pp. 39-49; 2007.
IBM; "Controlled Unsupervised Remote Software Installation Procedure/Software Utility"; ip.com electronic publication, ip.com No. IPCOM000139260D; Aug. 17, 2006.

* cited by examiner

*Primary Examiner* — Hyun Nam
(74) *Attorney, Agent, or Firm* — Brebetto Law Group (57) ABSTRACT

Methods, systems and computer products are provided for imposing pre-installation prerequisite checks on the install user to ensure a higher rate of installation success. Projected failure rates are calculated for scenarios in which a user opts to not perform one or more prerequisite activities prior to the installation. The system prompts the user to perform the prerequisites, and provides installation advices showing the projected failure rates in the event the user opts out of performing one or more prerequisites. The system may not allow the user to bypass some prerequisites designated as being mandatory to the installation.

14 Claims, 5 Drawing Sheets

IMPOSING PRE-INSTALLATION PREREQUISITE CHECKS ON THE INSTALL USER TO ENSURE A HIGHER RATE OF INSTALLATION SUCCESS

BACKGROUND

Installation of complex enterprise software products can be difficult due to the complexity of the associated applications, the large set of products they may contain, the different number of possible configurations they support, as well as due to the fact that customer environments tend to be very diverse. With conventional installation techniques it is nearly impossible to achieve a successful installation on first install attempt since conventional installation techniques generally fail one or more times before finally achieving a successful installation. The installation failures can be quite costly in terms of labor time and computer system down time.

The inventors recognized the need for a mechanism to reduce installation failures in complex enterprise software product deployments.

SUMMARY

Embodiments disclosed herein address the above stated needs by providing systems, methods and computer products for installing an enterprise software product. This may be achieved by receiving installation instructions at a computer, for example, by detecting insertion of a CD disk or other storage media containing installation instructions. Once the installation instructions have been received the system retrieves the installation prerequisites from them, including at least one mandatory prerequisite, and then displays installation advice for the mandatory prerequisite on a display screen of the computer. The installation advice has a prompt for the user to acknowledge reading the installation advice and/or performing the mandatory prerequisite. Once the computer detects the mandatory prerequisite has been performed it will allow the installation of the enterprise software product to continue.

BRIEF DESCRIPTION OF THE DRAWINGS

The accompanying drawings, which are incorporated in and constitute part of the specification, illustrate various embodiments disclosed herein. Together with the general description, the drawings serve to explain the principles of the various embodiments. In the drawings.

DETAILED DESCRIPTION

Installing complex enterprise software products can be a challenging task. Enterprise software products generally include multiple components that must be deployed and configured together. Customer environments are characterized by a great number of possible differences in the operating system (OS) packages, installed applications, security policies and file systems structures. As a result, a typical installation scenario often entails a complex configuration of enterprise middleware, including for example, application servers, database servers, and LDAP servers (Lightweight Directory Access Protocol servers). It helps for the complex enterprise software product to be highly customizable at deployment time in order to support a multitude of software and hardware platforms and configurations.

The present inventors recognized that it is often critical for a successful installation to identify and verify as many prerequisites as possible before starting the install. Since users are prone to ignore the installation instructions the various embodiments force the user to acknowledge installation advice and/or perform key installation prerequisite activities. An installation prerequisite is an activity to be performed or requirement to be satisfied before the installation begins. For example, the prerequisite may entail creating accounts, logins, roles, and users IDs. These activities may include obtaining administrator permissions/passwords for the OS or servers involved in the installation, setting up specified user domain accounts, specifying security categories, creating a database server login, and providing user IDs and roles, responsibilities and permissions for the installation team or user. Some prerequisites may require the install user to identify the software versions and verify that the software requirements and compatibility have been met. Other prerequisites may entail identifying the hardware and computer and server models and verifying the hardware system requirements and compatibility. In addition to the hardware and software considerations, the prerequisites may involve indentifying, gaining access to, and verifying compatibility with the environment in which the software is being installed, For example, the installation process may need access to the internet (or intranet), telephone lines, and/or wireless links. Sometimes, a user ID and password that is used in one sub-installer must match the user id and password used in another sub-installer. These cannot be checked without some complex installation software design. Often times when people deal with existing product installers (e.g., for databases and application servers), this is simply not possible. In general, the prerequisites may involve activities that should be performed before beginning the installation, or before reaching a specified point in the installation. If a key prerequisite is not performed it will likely either cause an installation failure or lead to errors in the installation. Performance of a prerequisite may entail verifying that a condition exists, performing one or more activities to put a condition in place, or identifying information or parameters needed for the installation. An important observation to make is that sometimes not all prerequisites can be checked programmatically by a conventional enterprise application (a solution) installer, because it is a wrapper over multiple product installers and it cannot know what the various product installers do in terms of disk space consumption, user IDs creation, default passwords settings, communication network ports openings/closures, or the like. The various embodiments disclosed herein overcome this issue.

One reason that prerequisites sometimes cause installation problems is that most people don't read the documentation supplied with the software that outlines the prerequisites. They just start installing the software package and expect its installer wizard or other logic to guide them through the steps to successfully complete the installation. Even if the install wizard contained all of the prerequisite documentation it is likely that, absent some incentive to perform the prerequisites, users would bypass reading this lengthy material and therefore run into the same problems. Furthermore, there may be some prerequisites that should be performed before starting the installation, or before reaching a certain point in the installation, rather than attempting to perform them on the fly once an error or other failure has been detected.

It is sometimes possible to pause the installation if the system detects a missing step or prerequisite that has not been satisfied. Some prerequisites may be handled by detecting them during installation and providing prompts or other installation instructions for them. This, however, is not possible for all prerequisites. Some prerequisites are not amenable to automated checking, and therefore the prerequisite cannot be verified/checked until the installation fails. These prerequisites that are not amenable to automated checking may be called undetectable prerequisites. Other prerequisites cannot be performed once the installation has begun or reaches a certain point. For these prerequisites it does not matter whether they can be detected or not because once the installation starts (or reaches a certain point) it is difficult or impossible to then perform the prerequisites. These prerequisites are also pre-conditions that should preferably be fulfilled before beginning the installation. This type of prerequisite may be called a precondition prerequisite. For example, if at a certain stage of installation one has to provide an existing user id or account, then by the time the installer gets to that point, it is too late to realize that one doesn't exist. Especially, if that user id must have been created by another IT system ahead of time. Likewise, at some point in the installation if you have to provide an existing VLAN, it must have been created ahead of time. Various embodiments disclosed herein overcome the failure of conventional systems to handle these types of prerequisites, and thus enhance the probability of successfully completing the installation. The various embodiments can significantly improve the first attempt success rate for installing complex enterprise products.

The various embodiments described herein increase the likelihood of installation success on a first-install by identifying the key prerequisites to the install user, and taking measures to force the user to read and acknowledge or perform the key prerequisites. If the install user does not satisfy the prerequisite acknowledgement/performance requirements, the user may be prevented from continuing further with the installation. In some embodiments checks are imposed on the user through the use of a checklist and a checkbox either for each individual prerequisite, for predefined groups of prerequisites, or for all the prerequisites taken together. Some of the various embodiments provide feedback to the user indicating the odds of a successful installation (or odds of causing an installation failure) if an installation attempt is made without satisfying the prerequisite.

Some embodiments pose a questionnaire, forcing the user to answer multiple choice questions before proceeding with the installation. Based on the answers the embodiments can decide whether to let the user proceed or deny the installation from proceeding. The system may calculate the likelihood of a successful installation based on the answers provided by the user regarding the prerequisites completed. The user is informed of the projected success percentages, and may proceed only if he is willing to take the risk. Other embodiments include a projected failure rate indicating the likelihood of an installation failure if the associated prerequisite is not performed. The various embodiments provide the ability to insert the installation checks into the install process, allowing the install designers more control in an effort to reduce the number of failed installs. The various embodiments provide the ability to interpose an evaluation to assess the chance of install success. The various embodiments also advise the user of the chance of a successful installation. In addition, various embodiments prevent the user from proceeding without completing the assessment. Based on our experience, by enforcing that the prerequisites are read and acknowledged before starting the installation process, the installation success rate can be significantly improved.

Figure 1:
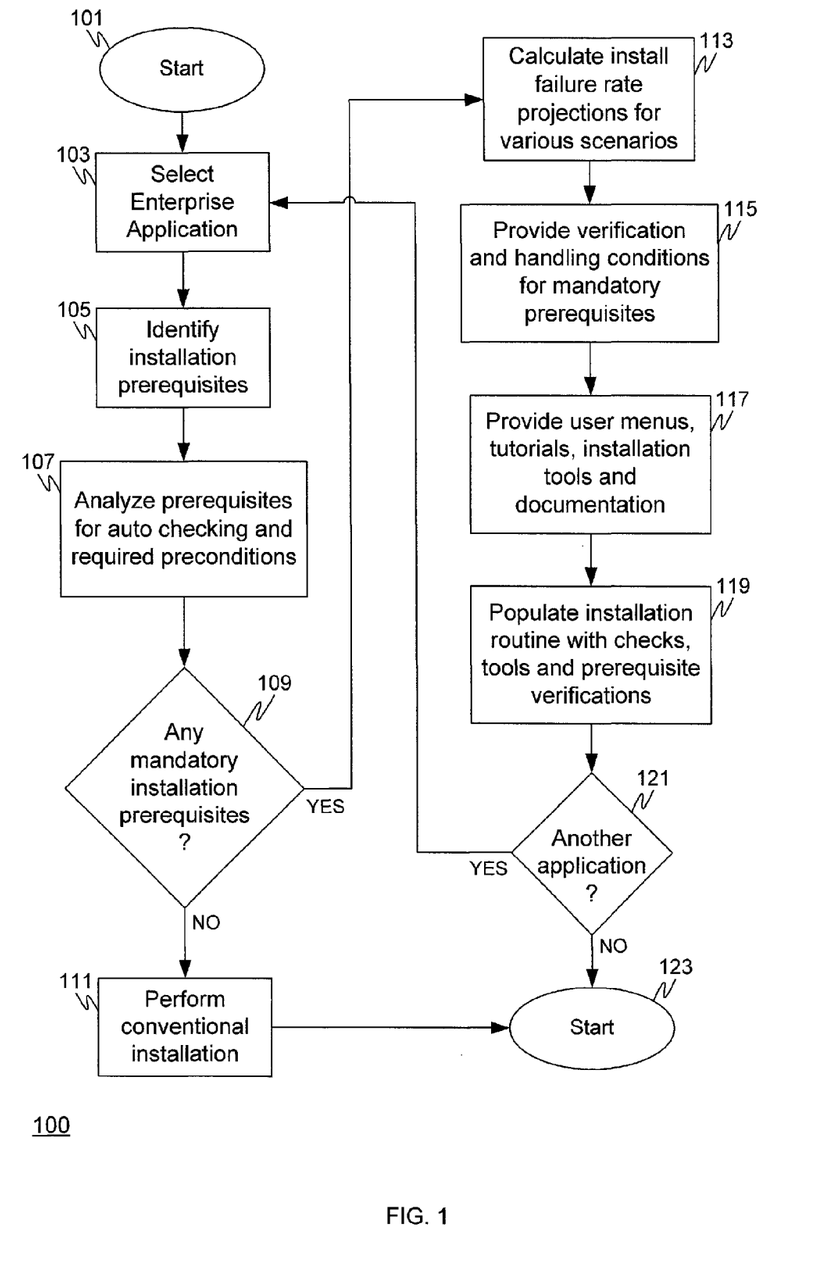
FIG. 1 is a flowchart depicting a method of preparing an enterprise application for installation according to various embodiments.

FIG. 1 is a flowchart 100 depicting a method of preparing an enterprise application product for installation according to various embodiments. The enterprise application product may be prepared in this manner by its creator or the vendor selling it before it is shipped to the user for installation. Referring to FIG. 1, the method begins at 101 and proceeds to 103 to select the enterprise application product for preparation. In block 105 the enterprise application is analyzed to identify its installation prerequisites. This may entail checking through the code and various software products for access and compatibility issues, hardware and software requirements, parameters that should be determined or initially set up, or any other activities that must be performed or information that must be determined before prior to installation of the enterprise application product. Once the prerequisites are determined in 105 the method proceeds to 107.

In block 107 the system analyzes the prerequisites for any that are not conducive to being automatically checked during the installation procedure—that is, not conducive to being checked by the computer without user intervention. The system also determines whether there are any prerequisites that are required preconditions for the installation—that is, activities that must be performed before the installation begins. Both of these types of prerequisites are mandatory prerequisites that may be handled in accordance with the various embodiments. In at least some embodiments, there may be a distinction between ordinary prerequisites and mandatory prerequisites based on a threshold failure rate projection for the mandatory prerequisite. The failure rate projection describes chances of causing an installation failure if the installation proceeds without performing the prerequisite. It may be useful to distinguish between ordinary prerequisites and mandatory prerequisites since there may be activities that could be performed prior to installation but are not worth the effort due to their low probability of causing an installation failure. For those embodiments in which a threshold is used to determine whether a prerequisite is a mandatory prerequisite the threshold may be any percentage of 20% or less (e.g., 20%, 10%, 1%, 0.1% or the like). The prerequisites with a projected failure rate above this threshold will be considered mandatory prerequisites.

There may be other prerequisites that are suggested to be performed prior to installation but are not mandatory prerequisites. These other non-mandatory prerequisites typically do not increase the chances of an installation failure by any appreciable amount (e.g., less than 1%) and can be handled with prompts provided during the installation. The method then proceeds to 109 to determine whether any of the prerequisites analyzed in 107 should be handled as mandatory prerequisites in accordance with the various embodiments. If it is determined in 109 that there are not any non-auto prerequisites or preconditions then the method proceeds from 109 along the "NO" path to 111 to carry out the installation in a conventional manner. However, if it is determined in 109 that there are one or more mandatory prerequisites then the method proceeds from 109 along the "YES" path to 113.

Block 113 of FIG. 1 calculates a projected installation failure rate for failing to perform the mandatory prerequisites from 109. In some embodiments the projected failure rate may be provided as a single percentage, while in other embodiments the rate may be provided as a range. For example, the rate may be specified as: "failing to perform Prerequisite_1 will cause installation failure 20% of the time." The rate may alternatively be displayed as a range, for example: "failing to perform Prerequisite_1 will cause installation failure 10% to 30% of the time." It may sometimes be the case that the mandatory prerequisites are interrelated. That is, failing to perform one mandatory prerequisite may raise or lower projected installation failure rate of one or more other mandatory prerequisites. In such instances the intertwined failure effect may be provided to the user in the form of a drop down menu, e.g., "failure to complete Prerequisite_1 will increase the likelihood that Prerequisite_2 will cause installation failure by an additional 5%" (or a range such as an additional 2% to 10%). The calculation of installation failure rates in block 113 may be performed by mathematical analysis based on a typical installation scenario, by empirical results from actual (or practice) installations, by an expert estimate, or by using any combination of these. Once the calculations have been completed in 113 for the projected failure rates the method proceeds to 115.

Figure 3A:
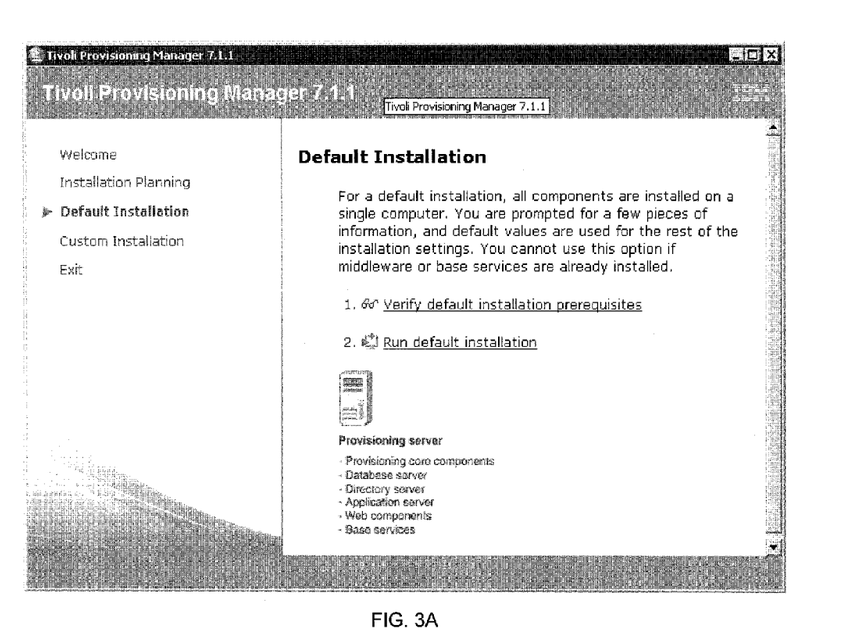
FIG. 3A-C depict typical screen shots provided during installation of an enterprise application according to various embodiments.
Figure 3B:
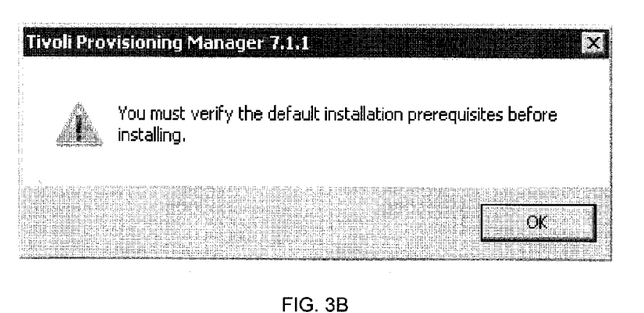
Figure 3C:
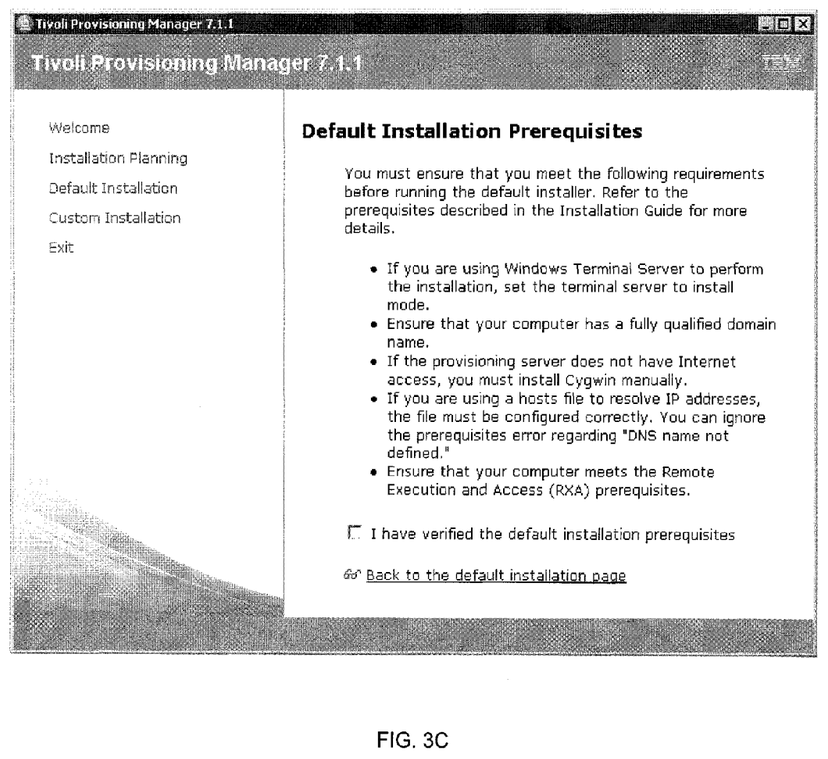

In 115 the verification and handling conditions for the mandatory prerequisites are specified. The verification and handling conditions includes the installation advice to be displayed for the user during installation. Examples of the installation advice are shown in FIGS. 3A-C. For example, the system may require that some of the mandatory prerequisites be completed before the installation can proceed. For these prerequisites the user must verify that the prerequisite has been completed before the installation will continue (e.g., by checking a box with a mouse click or otherwise manipulating an input device to verify completion, as shown in FIG. 3C). In some instances the system may automatically detect completion of the prerequisite. Other mandatory prerequisites may not require completion to continue the installation, but instead may result in a warning message if the user attempts to continue without completing the prerequisite such as the error message depicted in FIG. 3B. If the system is capable of verifying a mandatory prerequisite then automatic verification for that prerequisite may be specified in block 115. However, if the system cannot automatically verify a given mandatory prerequisite, then the system may be set up to prompt the user as to whether it has been completed or not or display other such installation advice such as the projected failure rate if the mandatory prerequisite remains undone. The user completion prompt may be in the form of a box that the user clicks on with a mouse, or may be in the form of an entry of data, e.g., entering a pathname, user ID, serial number, or other such data that the user would discover during completion of the prerequisite. If entry of the data is required, then the data itself may be verified, e.g., the format of the serial number may be checked to verify that it conforms to the format of an actual serial number (e.g., right number of digits, correct location of alphanumerical characters) and is not simply an entry made up by the user in order to continue with the installation. Once the verification and handling conditions for mandatory prerequisites has been specified in 115 the method proceeds to 117.

Block 117 involves formatting the installation advice that is shown to the user. This may entail the creation and formatting of various user prompts, verification inputs, acknowledgement inputs, user menus, tutorials, installation tools and any associated documentation for the installation. These aspects of the embodiments generally provide information to assist and guide the user during the installation process. Some embodiments may provide one standard set of such information. In other embodiments different levels of documentation/guidance may be available, depending upon the user's level of expertise. The system may provide one or more prompts asking the user's level of expertise, or may make an assumption based on answers to other questions, other inputs received from the user or the actions of the user in initiating the installation. The level of detail provided in the installation advice may be based on a determination of the user's level of expertise.

The installation advice may include one or more prompts requesting the user to acknowledge reading the installation advice. The installation advice may include one or more prompts requesting the user to verify that the mandatory prerequisite(s) have been performed. The installation advice may provide projected estimates of the chances of an installation failure for various prerequisites (if they are not performed). Several of these projected failure rates may be provided, one for each of the mandatory prerequisites. The installation advice may also provide an overall projected estimate for a successful installation that incorporates each of the projected failure estimates. Once the various user guidance information has been specified and formatted in 119 the method proceeds to 121. If there is another enterprise application product to be prepared for installation according to various embodiments the method proceeds from 121 along the "YES" path to 103. If there is no other enterprise application product the method proceeds from 121 along the "NO" path to 123 and ends.

Figure 2:
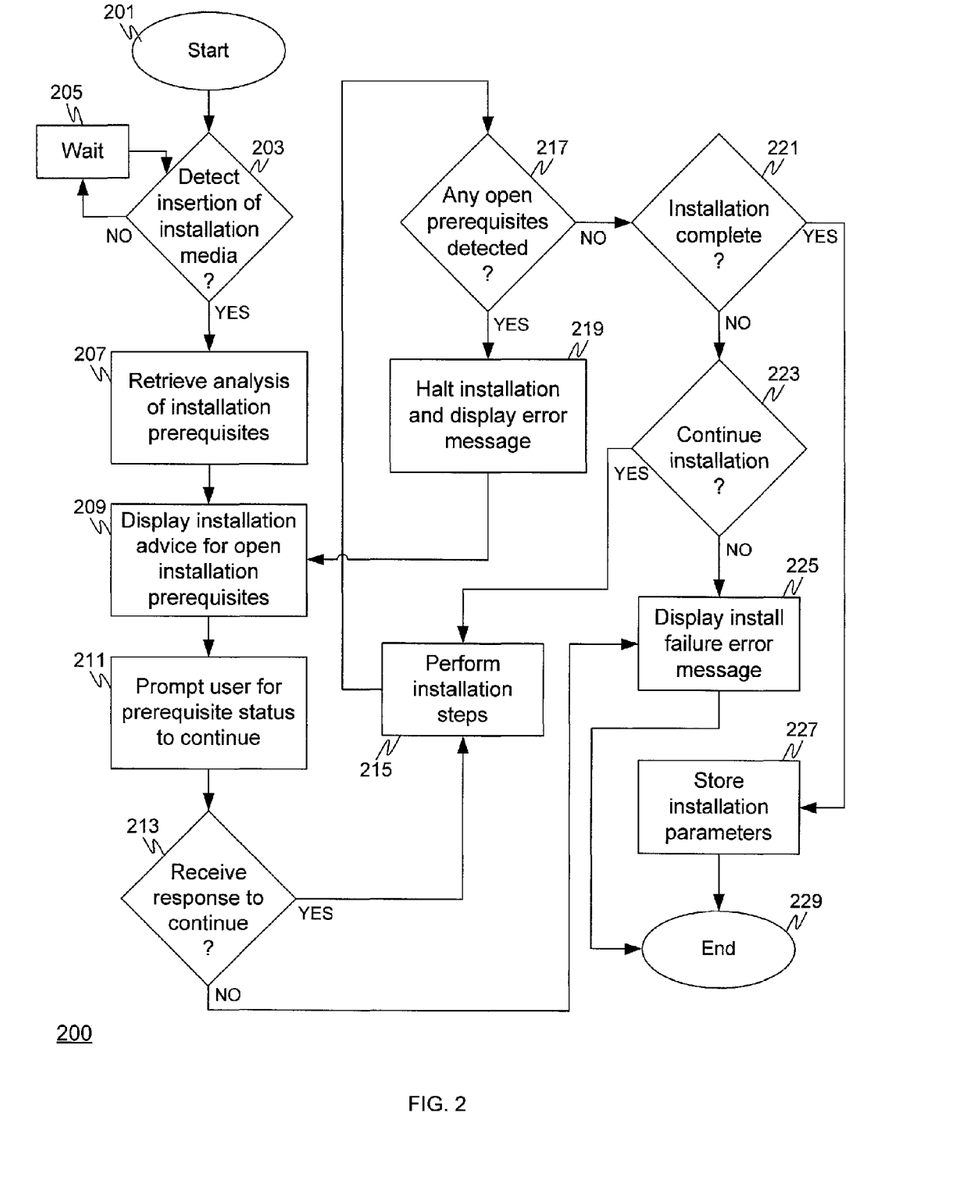
FIG. 2 is a flowchart depicting a method installing an enterprise application according to various embodiments.

FIG. 2 is a flowchart 200 depicting a method installing an enterprise application according to various embodiments. This method provides in indication of the mandatory prerequisites to the user, and prompts for a response. The response may be an indication that the prerequisite has been completed, or an acknowledgment that the user has read the chances of an install failure but plans to proceed with the installation without completing the prerequisite (if allowed by the system). The method begins at 201 and proceeds to 203 to determine whether the user is ready to begin installing the application. This may be done by detecting insertion of removable memory media at a computer (e.g., detecting or reading a CD or other removable memory device being inserted into a drive of the computer). Alternatively, block 203 may entail detecting installation instructions being received at the computer (e.g., receiving the installation instructions via the Internet or a communications link). Once the beginning of an enterprise software product installation has been detected the method proceeds from 203 along the "YES" path to 207. Upon proceeding to 207 the system may display a screen message such as that shown in FIG. 3A for the user to indicate that the installation prerequisites may be verified, or in some instances acknowledged, before continuing with the installation procedure.

In 207 the system detects and retrieves the installation prerequisites from the installation instructions on the removable media. Typically, an analysis has been performed at some timer prior to beginning the installation to determine the various installation prerequisites, including mandatory prerequisites. For example, the analysis of the installation prerequisites may include the results from blocks 107-115 as described above in conjunction with FIG. 1. The method then proceeds to 209 to display installation advice for the open installation prerequisites. The installation advice may advise the user that the installation cannot continue until certain mandatory prerequisites have been completed. For other prerequisites the installation program may be allowed to continue, but the user will be required to acknowledge reading the chances of installation failure if the user opts to continue without completing a given mandatory installation prerequisite. The installation advice may also include either displayed information, or information contained in a drop-down or pop-up menu, containing installation instructions or helpful information about one or more mandatory prerequisite steps. Once the installation advice has been displayed in block 209 the method proceeds to 211.

Some mandatory prerequisites may not be amenable to automatic verification by the system. In such instances the system will provide a user prompt in block 211, questioning whether the user has completed the prerequisite. In other instances the user may be allowed to continue with the installation even though the prerequisite has not been completed. In such instances an installation advice prompt may be displayed indicating to the user the odds of an installation failure if installation continues without performing the prerequisite. In other situations the system may be able to detect completion of the prerequisite. If such situations the installation advice indicates to the user that the installation will not be allowed to continue until the prerequisite has been completed. Once the user prompt with installation advice has been provided for the user in 211 the method proceeds to 213 to detect the user's response to the prompt.

In block 213 if the system does not detect a positive user response (indicating the prerequisite has been performed) the method proceeds from 213 along the "NO" path to 225 to display an install failure error message. In some embodiments the prompts may be set up to provide an acknowledgement that the installation advice has been read but the mandatory prerequisite was not performed indicating a failure to receive a positive response verifying performance of the prerequisite. Upon displaying the error message the method then proceeds to block 229 and ends. Such an acknowledgement without verification of the prerequisite performance would also result in displaying the error message. Returning to block 213, if the system detects a positive user response (e.g., mouse click or hitting the enter key or other predefined input indicating that the prerequisite was performed) then the method proceeds from 213 along the "YES" path to block 215. Further regarding block 213, in some implementations the system may have a timeout restriction for receiving a user input while other implementations may not have any timeout restriction. In such embodiments the system detects whether a user response is received within a predefined time, or upon the occurrence of some other event such as a different unexpected user input, the computer's power being shut off, or other like type of non responsive input or action.

Turning to block 215, the method executes one or more installation steps in the predefined order of the installation script. At a predetermined juncture the method proceeds to block 217 for the system to detect whether there are any open prerequisites. If an open (unperformed) mandatory prerequisite is detected the method proceeds from 217 along the "YES" path to 219 to halt the installation procedure and display an error message to the user. The error message may be installation advice urging the user to perform the prerequisite action. The method then proceeds back to block 209 to again display the analysis (e.g., failure projection percentages) for proceeding without completing the prerequisite. Returning to block 217, if the system does not detect any open prerequisites, the method proceeds from 217 along the "NO" path to 221.

Block 221 determines whether the installation is complete. If it is determined in block 221 that the installation is not yet complete the method proceeds from 221 along the "NO" path to 223 to see whether the user wants to continue with the installation. (This is done to avoid a continuous loop.) If the user does not desire to continue with the installation, or if a predetermined number of installation attempts have been reached without successfully completing the installation, the method proceeds from 223 along the "NO" path to 225 to display an installation failure error message. Upon displaying the error message in 225 the method proceeds to 229 and ends. However, if it is determined in block 223 to continue with the installation the method proceeds from 223 along the "YES" path to block 215 to again perform one or more installation steps.

Returning to block 221, if the system determines that the installation is complete the method proceeds from 221 along the "YES" path to 227 to store any installation parameters needed to complete the installation. The method then proceeds to 229 and ends.

Figure 4:
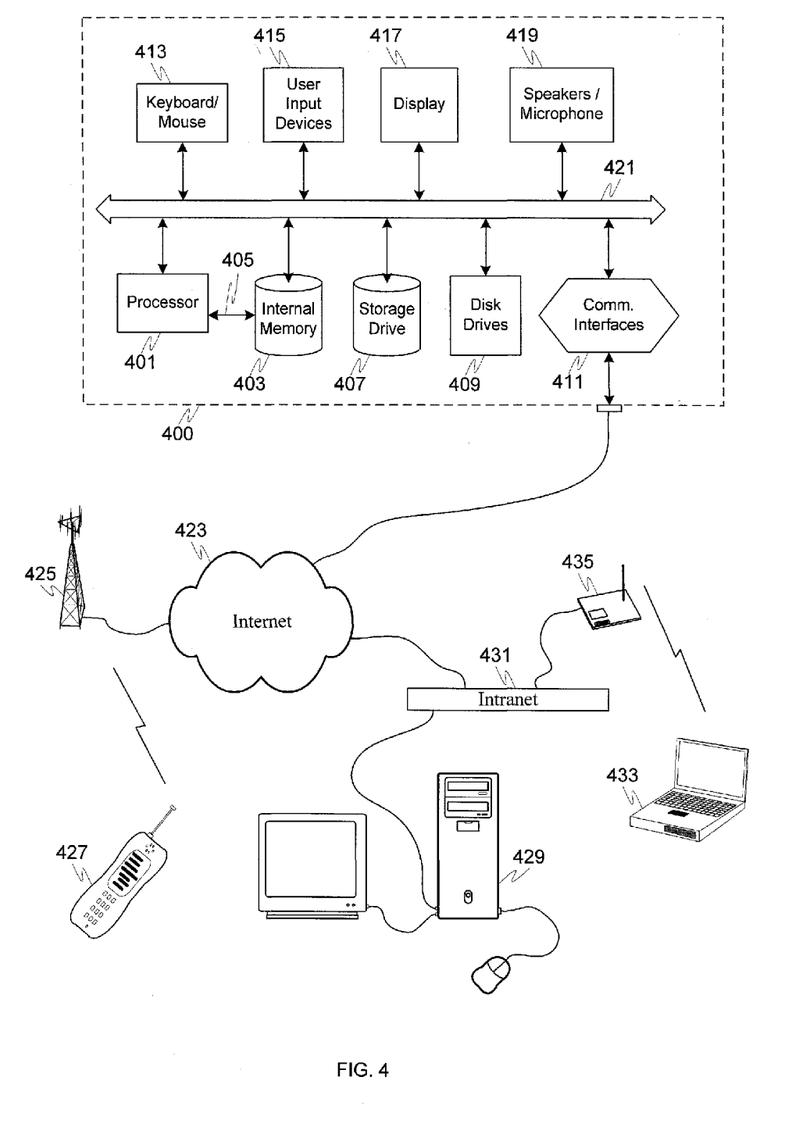
FIG. 4 depicts an example of an information system typical of those on which an enterprise application would be installed according to various embodiments.

FIG. 4 depicts an example of an information system typical of those on which an enterprise application would be installed and implemented according to various embodiments. The computer system 400 may be configured in the form of a desktop computer such as the computer 429, a laptop computer such as laptop 433, a mainframe computer, or any other hardware or logic arrangement capable of being programmed or configured to carry out instructions. The computer system 400 may be located and interconnected in one location, or may be distributed in various locations and interconnected via communication links such as a local or wide area network (LAN or WAN), via the Internet 423, via the public switched telephone network (PSTN), a cellular telephone network 425, a wireless node 435, or other such communication links. Other devices may also be suitable for implementing or practicing the embodiments, or a portion of the embodiments. Such devices include personal digital assistants (PDA), wireless handsets 427 (e.g., a cellular telephone or pager), and other such consumer electronic devices preferably capable of being programmed to carry out instructions or routines.

Computer system 400 includes a processor 401 which may be embodied as a microprocessor, two or more parallel processors, central processing unit (CPU) or other such control logic or circuitry. The processor 401 is configured to access an internal memory 403, generally via one or more busses such the system bus 421. The internal memory 403 may include one or more of random access memory (RAM), read-only memory (ROM), cache memory, or a combination of these or other like types of circuitry configured to store information in a retrievable format. In some implementations the internal memory 403 may be configured as part of the processor 401, or alternatively, may be configured separate from it but within the same packaging. The processor 401 may be able to access internal memory 403 via a different bus or control lines (e.g., local bus 405) than is used to access the other components of computer system 400.

The computer system 400 also includes, or has access to, one or more storage drives 407 (or other types of storage memory) and floppy disk drives 409. Storage drives 407 and the floppy disks for floppy disk drives 409 are examples of machine readable (also called computer readable) mediums suitable for storing the final or interim results of the various embodiments. The floppy disk drives 409 may include a combination of several disc drives of various formats that can read and/or write to removable storage media (e.g., CD-R, CD-RW, DVD, DVD-R, floppy disk, or the like). The computer system 400 may either include the storage drives 407 and floppy disk drives 409 as part of its architecture (e.g., within the same cabinet or enclosure and/or using the same power supply), as connected peripherals, or may access the storage drives 407 and floppy disk drives 409 over a network, or a combination of these. The storage drive 407 is often a hard disk drive configured for the storage and retrieval of data, computer programs or other information. The storage drive 407 need not necessarily be contained within the computer system 400. For example, in some embodiments the storage drive 407 may be server storage space within a network that is accessible to the computer system 400 for the storage and retrieval of data, computer programs or other information. In some instances the computer system 400 may use storage space at a server storage farm, or like type of storage facility, that is accessible by the Internet 423 or other communications lines. The storage drive 407 is often used to store the software, instructions and programs executed by the computer system 400, including for example, all or parts of the computer application program for carrying out activities of the various embodiments.

The computer system 400 may include communication interfaces 411 configured to be communicatively connected to the Internet, a local area network (LAN), a wide area network (WAN), or connect with other devices using protocols such as the Universal Serial Bus (USB), the High Performance Serial Bus IEEE-1394 and/or the high speed serial port (RS-232). The computers system 400 may be connected to the Internet via the wireless router 401, or a wired router or other such access node (not show). The components of computer system 400 may be interconnected by a bus 421 and/or may include expansion slots conforming to any of various industry standards such as PCI (Peripheral Component Interconnect), ISA (Industry Standard Architecture), or EISA (enhanced ISA).

Typically, the computer system 400 includes one or more user input/output devices such as a keyboard and/or mouse 413, or other means of controlling the cursor represented by the user input devices 415 (e.g., touchscreen, touchpad, joystick, trackball, etc.). The communication interfaces 411, keyboard and mouse 413 and user input devices 415 may be used in various combinations, or separately, as means for receiving information and other inputs to be used in carrying out various programs and calculations. A display 417 is also generally included as part of the computer system 400. The display may be any of several types of displays, including a liquid crystal display (LCD), a cathode ray tube (CRT) monitor, a thin film transistor (TFT) array, or other type of display suitable for displaying information for the user. The display 417 may include one or more light emitting diode (LED) indicator lights, or other such display devices. In addition, most computer systems 400 also include, or are connected to, one or more speakers and microphones 419 for audio output and input. Speech recognition software may be used in conjunction with the microphones 419 to receive and interpret user speech commands.

Various activities may be included or excluded as described above, or performed in a different order, while still remaining within the scope of at least one of the various embodiments. For example, block 217 of FIG. 2 involves detecting whether there are any open mandatory prerequisites. This activity may either be performed after each installation step or at predefined intervals or predefined junctures in the installation process. Another activity that can take place in a different order is 207. It may be the case that the odds of successfully completing the installation can vary depending upon how far along the installation has progressed. In some embodiments the error message block 219 may proceed to 207 rather than 209 in order to retrieve the updated odds of successfully completing the installation based on what point the open prerequisite was detected. Another example of an activity that may be performed in a manner different than that shown in the figure is that of step 225. In some embodiments, the error message of 225 may indicate that the installation has been halted because the mandatory prerequisite has not yet been performed. Once the error message of step 225 is displayed the user may be given the opportunity to either end the installation or to try to perform the prerequisite again. Other steps or activities of the methods disclosed herein may be omitted or performed in a different manner while remaining within the intended scope of the various embodiments. The method may be implemented through the addition and manipulation of circuitry to a design, hence is applicable for analysis using logic evaluation frameworks such as logic simulators or formal verification constructs, as well as hardware-based frameworks such as hardware emulators/accelerators and even fabricated chips.

The various embodiments may be implemented with any sort of processing units, processors and controllers (e.g., processor 401 of FIG. 4) capable of performing the stated functions and activities. For example, the processor 401 may be embodied as a microprocessor, microcontroller, DSP, RISC processor, two or more parallel processors, or any other type of processing unit that one of ordinary skill would recognize as being capable of performing or controlling the functions and activities described herein. A processing unit in accordance with at least one of the various embodiments can operate computer software programs stored (embodied) on computer-readable medium such those compatible with the disk drives 409, the storage drive 407 or any other type of hard disk drive, CD, flash memory, ram, or other computer readable medium as recognized by those of ordinary skill in the art.

The computer software programs can aid or perform the steps and activities described above for installation of an enterprise software product. For example computer programs in accordance with at least one of the various embodiments may include: source code for receiving installation instructions at a computer; source code for retrieving installation prerequisites including at least one mandatory prerequisite from the installation instructions; source code for displaying installation advice for the mandatory prerequisite on a display screen of the computer; source code for displaying a prompt associated with the installation advice for the mandatory prerequisite; source code for detecting a user input in response to the prompt acknowledging the installation advice; and source code for allowing the installation of the enterprise software product to continue in response to the detecting of the user input. There are many further source code modules that may be written to perform the various steps, activities and procedures disclosed above that are intended to lie within the scope of the various embodiments. Various activities may be included or excluded as described above, or performed in a different order, with the rest of the activities still remaining within the scope of at least one exemplary embodiment.

The various embodiments have been described in terms of an installation prerequisite being an activity to be performed or requirement to be satisfied before the installation begins. Various embodiments may also pertain to intermediate prerequisites which are activities to be performed or requirements to be satisfied before a predefined point in the installation. The term enterprise software product has also been used in describing the various embodiments. An enterprise software product is software suitable for use in a business environment that may communicate or exchange data between one or more platforms, computers or processing units to perform a given function or purpose. Typically enterprise software products consist of multiple components such as web servers, application servers, database servers, lightweight directory protocol servers, or the like, each of which is a product in its own right and would have its own installer. The term installation instructions, as used herein, is intended to include the code, software, and text instructions provided as part of or in conjunction with installation software for installing an enterprise software product.

The description of the various embodiments provided above is illustrative in nature inasmuch as it is not intended to limit the various embodiments disclosed herein, their application, or uses. Thus, variations that do not depart from the intents or purposes of the various embodiments are intended to be encompassed. Such variations are not to be regarded as a departure from the intended scope of the present invention.

What is claimed is:

1. A method of installation of an enterprise software product on a computer, comprising:
   receiving installation instructions at the computer as part of initiating the installation;
   retrieving installation prerequisites including at least one mandatory prerequisite from the installation instructions;
   displaying installation advice for said mandatory prerequisite on a display screen of the computer, wherein said installation advice includes a projected failure percentage for not performing the mandatory prerequisite;
   displaying a prompt on a display device of said computer requesting acknowledgement of the installation advice for said mandatory prerequisite; suspending the installation from proceeding in response to displaying the prompt;
   detecting a user input in response to the prompt acknowledging said installation advice;
verifying performance of the mandatory prerequisite; and
   allowing continuing with the installation of said enterprise software product to continue in response to both the detecting of said user input and the verifying of the mandatory prerequisite.

2. The method of claim 1, wherein the receiving of said installation instructions at the computer comprises:
   detecting a removable media containing the installation instructions being inserted into the computer;
   wherein the detecting of the user input comprises detecting the user input via a user input device.

3. The method of claim 1, wherein said mandatory prerequisite is not conducive to being automatically checked during the installation.

4. The method of claim 1, further comprising:
   preventing the installation of said enterprise software product to continue in response to the detecting of said user input acknowledging said installation advice but not verifying performance of the mandatory prerequisite.

5. The method of claim 4, further comprising:
   displaying an error message indicating that the installation has been halted because the mandatory prerequisite has not yet been performed.

6. The method of claim 1, wherein said prompt acknowledges reading of said installation advice, the allowing continuing step further comprising:
   allowing continuing with the installation of said enterprise software product to continue in response to the detecting of said user input and in response to the computer detecting performance of the mandatory prerequisite.

7. A software product comprising a non-transitory machine readable medium including a program of instructions, wherein the program of instructions upon being executed on a computer causes the computer to perform activities comprising:
   receiving installation instructions at the computer for installation of an enterprise software product as part of initiating the installation;
   retrieving installation prerequisites including at least one mandatory prerequisite from the installation instructions;
   displaying installation advice for said mandatory prerequisite on a display screen of the computer, wherein said installation advice includes a projected failure percentage for not performing the mandatory prerequisite;
   displaying a prompt on a display device of said computer requesting acknowledgement of the installation advice for said mandatory prerequisite;
suspending the installation from proceeding in response to displaying the prompt;
   detecting a user input in response to the prompt acknowledging said installation advice;
verifying performance of the mandatory prerequisite; and
   allowing continuing with the installation of said enterprise software product to continue in response to both the detecting of said user input and the verifying of the mandatory prerequisite.

8. The software product of claim 7, wherein the receiving of said installation instructions at the computer comprises:
   detecting a removable media containing the installation instructions being inserted into the computer;
   wherein the detecting of the user input comprises detecting the user input via a user input device.

9. The software product of claim 7, wherein said mandatory prerequisite is not conducive to being automatically checked during the installation.

10. The software product of claim 7, further comprising:
    preventing the installation of said enterprise software product to continue in response to the detecting of said user input acknowledging said installation advice but not verifying performance of the mandatory prerequisite.

11. The software product of claim 10, further comprising:
    displaying an error message indicating that the installation has been halted because the mandatory prerequisite has not yet been performed.

12. The software product of claim 7, wherein said prompt acknowledges reading of said installation advice, the allowing continuing step further comprising:
    allowing continuing with the installation of said enterprise software product to continue in response to the detecting of said user input and in response to the computer detecting performance of the mandatory prerequisite.

13. A computer system comprising:
a disk drive configured to detect insertion of a removable media as part of initiating an enterprise software installation, the disk drive further being configured to read installation instructions on the removable media and detect installation prerequisites including at least one mandatory prerequisite from the installation instructions;
    a display screen configure to display installation advice for said mandatory prerequisite, the display screen further displaying a prompt requesting acknowledgement of the installation advice for said mandatory prerequisite;
    a user input device configured to accept a user input in response to the prompt acknowledging said installation advice; and
    processor configure to execute instructions suspending the installation from proceeding in response to displaying the prompt, the instructions further verifying performance of the mandatory prerequisite and allowing continuing with the installation of said enterprise software product to continue in response to both detecting said user input acknowledging said installation advice and verifying performance of the mandatory prerequisite.

14. The computer system of claim 13, wherein the processor is further configured to execute instructions preventing the installation of said enterprise software product to continue in response to the detecting of said user input acknowledging said installation advice but not verifying performance of the mandatory prerequisite.

* * * * *